(12) United States Patent
Lorenzen et al.

(10) Patent No.: US 11,241,300 B2
(45) Date of Patent: Feb. 8, 2022

(54) CUSTOMIZABLE DENTAL DEVICE

(71) Applicant: STRAUMANN HOLDING AG, Basel (CH)

(72) Inventors: Julian Lorenzen, Basel (CH); Andreas Van Ophuysen, Stein (CH)

(73) Assignee: STRAUMANN HOLDING AG, Basel (CH)

( * ) Notice: Subject to any disclaimer, the term of this patent is extended or adjusted under 35 U.S.C. 154(b) by 0 days.

(21) Appl. No.: 16/839,594

(22) Filed: Apr. 3, 2020

(65) Prior Publication Data

US 2020/0315755 A1 Oct. 8, 2020

(30) Foreign Application Priority Data

Apr. 3, 2019 (EP) .................... 19167105

(51) Int. Cl.
*A61C 13/34* (2006.01)
*A61C 13/30* (2006.01)
*A61C 8/00* (2006.01)

(52) U.S. Cl.
CPC .............. *A61C 13/34* (2013.01); *A61C 8/008* (2013.01); *A61C 13/30* (2013.01); *A61C 2201/005* (2013.01)

(58) Field of Classification Search
CPC ..... A61C 8/008; A61C 8/0083; A61C 8/0001; A61C 8/0006; A61C 2201/005; A61C 13/0001
See application file for complete search history.

(56) References Cited

U.S. PATENT DOCUMENTS 5,403,188 A * 4/1995 Oxman ................ A61C 13/087
433/218
5,759,036 A * 6/1998 Hinds .................... A61C 8/005
433/172

(Continued)

FOREIGN PATENT DOCUMENTS

EP         3298983 A1    3/2018
KR       101714311 B1    3/2017
WO  WO2019/202113 A1 * 10/2019

OTHER PUBLICATIONS

"Polycaprolactone" Science Direct, 2012. Accessed at https://www.sciencedirect.com/topics/chemical-engineering/polycaprolactone on Sep. 15, 2020 (Year: 2012).*

(Continued)

*Primary Examiner* — Edward Moran
(74) *Attorney, Agent, or Firm* — Oliff PLC (57) ABSTRACT

The present invention relates to a dental device adapted to be connected to a dental implant fixture, wherein the device at least comprises an scan body comprising polyether ether ketone (PEEK) adapted to be connected to the dental implant fixture and adapted to be captured by a scanning device, and a customizable gingiva body mounted to the scan body in a fixed position, wherein the gingiva body comprises a thermoplastic polymer adapted to be captured by a scanning device and at least partially comprising a polymer comprising a melting point of $\geq 35°$ C. and $\leq 80°$ C. In addition, the invention relates to a process for the production of a customized dental model and the use of a digital model obtained by the inventive process to produce customized crown models.

10 Claims, 10 Drawing Sheets

(56) References Cited

U.S. PATENT DOCUMENTS

| | | | |
|---|---|---|---|
| 7,674,850 B2* | 3/2010 | Karim | A61K 6/891 |
| | | | 524/493 |
| 2012/0045735 A1* | 2/2012 | Drapeau | A61C 8/0006 |
| | | | 433/172 |
| 2012/0202170 A1* | 8/2012 | Johnson | A61C 8/005 |
| | | | 433/173 |
| 2013/0149667 A1 | 6/2013 | Lu et al. | |
| 2015/0157424 A1* | 6/2015 | Zadeh | A61C 8/008 |
| | | | 433/172 |
| 2015/0196371 A1 | 7/2015 | Westover | |
| 2017/0007372 A1* | 1/2017 | Blaisdell | A61C 8/0001 |
| 2017/0151038 A1 | 6/2017 | Fan et al. | |

OTHER PUBLICATIONS

Sep. 26, 2019 Extended European Search Report issued in European Patent Application No. 19167105.6.

* cited by examiner

CUSTOMIZABLE DENTAL DEVICE

TECHNICAL FIELD

The present invention relates to a dental device adapted to be connected to a dental implant fixture, wherein the device at least comprises an scan body comprising polyether ether ketone (PEEK) adapted to be connected to the dental implant fixture and adapted to be captured by a scanning device, and a customizable gingiva body mounted to the scan body in a fixed position, wherein the gingiva body comprises a thermoplastic polymer adapted to be captured by a scanning device and at least partially comprising a polymer comprising a melting point of ≥35° C. and ≤80° C. In addition, the invention relates to a process for the production of a customized dental model and the use of a digital model obtained by the inventive process to produce customized crown models.

BACKGROUND

The indication for a replacement of lost or broken teeth within a dental arch is not only based on aesthetic reasons. In order to maintain a correct function and proper alignment of the jaws in the future and, in addition, in order to avoid any secondary complication like infections and tooth decay based on the ill-defined condition, it is a common dentist procedure to fill the unintentionally appearing void with a dental implant. The placement of the implant can be accomplished in successive stages. In a first stage, a dental practitioner or surgeon can review the clinical situation and determine an appropriate strategy for the overall alignment of the dental implant. In a second stage, the bone structure can be prepared by drilling in order to accommodate a dental implant fixture, wherein the latter is pressed or screwed into the bone. The fixture assures the mechanical anchoring of the further implant parts and, for instance, a healing abutment can be attached to the dental fixture. Such multi-part implants are more versatile, because the anchoring part and the abutment can be adapted to individual patient needs. In particular, it is possible to adapt the abutment orientation relative to the anchoring part, after placing the implant fixture. This provides more flexibility and is less prone to unrecoverable errors. In addition, for the different implant parts different materials can be used and, thus, the overall device can be adapted to the mechanical requirements at hand. In the last stage the healing set-up is replaced or optimized by a more natural looking final prosthesis or restoration, for instance including a crown structure. The overall procedure restores the initial mechanical arch architecture and provides a better aesthetic outcome.

In the last decades several different treatment options have evolved in order to optimize implant planning, precision of the implant operation and final crown design. In the past, planning and crown design was based on several physical plaster or stone impressions taken before and after the dental implantation process. The main target of the impression is directed to the transfer of the patient specific dental implant surrounding to a technician, in order to assure the processing of an optimal implant adapted to the patient needs. Later on this approach was transferred into the digital world.

KR 10 171 4311 B1 for instance relates to an implant assembly which maximizes convenience in procedures and provides accurate scanning information during a computer aided design (CAD)/computer aided manufacturing (CAM) operation using a digital optical scanner for oral cavity. The document further discloses that a scan body and a healing abutment may be separated from each other.

Another healing abutment system and its use is disclosed in WO 2017 085 288 A1. The abutment system can include a base part adapted to be coupled to a dental implant via an abutment screw and a healing cap that can be coupled to the base part by a further screw. The healing cap can include features that can be scanned by an intra-oral scanning system or transferred to a physical impression to convey information regarding the position and orientation of the base part.

A further process including oral scanning techniques is disclosed in WO 2015/030281 A1. The patent document describes an implant assembly which enables a simple medical procedure and minimizes patient burden. A scan body comprises: a polygonal projection unit formed at the bottom end thereof; a body unit which is formed at the top thereof, has at least one plane unit parallel with one surface of the polygonal projection unit, and is larger than the projection unit; a slanted connection unit for connecting the polygonal projection unit and the body unit; and a through-hole vertically formed at the central portion thereof. The scan body is fixed, by a fixing screw to a fixture fixed to the alveolar bone. The scan body may form an emergency profile that is similar to a natural tooth even when treating gingiva, and scanning is possible in a state where the scan body is mounted, so that medical procedures can be simpler and the burden that a patient may feel can be minimized.

Nevertheless, besides the existing solutions in the field of dental abutment systems, there is still the need for scanable dental devices, wherein the devices are customizable to patient specific needs and wherein the device set-up can easily be transferred into a digital model.

SUMMARY

Therefore, the present invention has the object of providing a flexible and scanable dental abutment device, wherein the device additionally enables to include the patient gingiva surrounding of the implant. This object has been achieved by a multi-part dental abutment device according to the claims, by a process for the production of a customized crown model inter alia based on a digital model according to the claims and by the use according to the claims to manufacture a customized crown model. Advantageous embodiments are the subject of the dependent claims. They may be combined freely unless the context clearly indicates otherwise.

Accordingly, the inventive dental device is adapted to be connected to a dental implant fixture, wherein the device at least comprises a scan body comprising polyether ether ketone (PEEK) adapted to be connected to the dental implant fixture and adapted to be captured by a scanning device, and a customizable gingiva body mounted to the scan body in a fixed position, wherein the gingiva body comprises a thermoplastic polymer adapted to be captured by a scanning device and at least partially comprising a polymer comprising a melting point of ≥35° C. and ≤80° C.

Surprisingly, it was found that above described dental devices are able to deliver essential advantages compared to the state of the art devices in dental prosthetics. The device enables a comprehensive concept taking not only care for the isolated tooth structure, but also for the functional tooth surrounding. Especially, the gum or gingival tissue is important for a proper healing and also determines the functional performance of the implant. The inventive device is easily in-vivo adaptable and the actual and later stages in the treatment can be based on an exact replica of the gingiva tissue right after placing the implant fixture. This enables a more natural looking gingiva and further assures the right proportions between the gingiva and the scan body. An additional advantage is that the overall set-up of device and customizable gingiva part is scanable, thus enabling an easy transfer of the physical device into the digital world. The device can be scanned in-vivo in the oral cavity and based on the fact that the customized gingiva part as well as the scan body are scanable the overall set-up can be exactly traced. In addition, based on the scanable feature it is also possible to determine the relative orientation of both parts in the oral cavity as well as in relation to each other. Especially, the latter may help to include further safety measures and to assure the possibility to generate a detailed digital model.

A dental device according to the invention is a connector, either secured onto or built into the top of the dental implant fixture. The dental device can be placed in the fixture for instance during the healing phase and can later on be replaced by other devices.

The dental device is adapted to be connected to a dental implant fixture. This means that the dental device comprises features or is adapted that additional features are attached thereto in order to be connected to a dental implant fixture, fixed in the bone structure of a jaw. The means for attaching may for instance include a bolt or a screw. In addition, it is possible that the dental device may comprise at the bottom a screw thread, wherein a screw may be inserted. The screw part which is not used in the dental device can be used for attaching the device to the implant fixture. It is also possible that other mechanical or chemical connecting systems are used, wherein the implant fixture comprises the opposite mechanical attachment means compared to the dental device. Preferably, the connection between dental implant fixture and device is established via the scan body of the dental device.

The scan body comprises polyether ether ketone (PEEK). Preferably, the scan body can be made from any material that is mechanical stable and biocompatible. Nevertheless, in order to assure that the scan body is scanable and, in addition, in order to assure a proper mechanical compatibility with the customizable gingiva body at least a part of the material is PEEK, a polymer comprising the following repetition unit Preferably, at least 50 weight %, preferably at least 75 weight % and further preferred 90 weight-% of the scan body are PEEK. Suitable blending polymers may be selected from the group consisting of PAEK polymers such as PEK, PEKK, PEKEKK, etc., with a glass transition temperature in between 143-160° and high crystalline melt temperatures between 335-441° C. Preferably, the PEEK may comprise a glass transition temperature in the range of 130° C.-160° C. and a crystalline melt transition temperature ($T_m$) larger than 300° C. In addition, besides the fact that the scan body may comprise further polymers it is also possible that the scan body comprises further substances generally used in the field of polymeric substrates. Additional substances may include fillers, pigments, rheology modifiers, medicaments, antibacterial substances (e.g. antibacterial ions), stabilizers, and the like.

The scan body is adapted to be captured by a scanning device. On the one hand, the scan body can be scanned as is by an optical scanner, e.g. an intraoral scanner (io-scanner) based on optical recording techniques like a film or a CCD-chip. In order to increase the scanability the scan body may comprise further substances increasing the contrast and scanability with respect to the scan body surrounding. On the other hand, the scan body can be radiolucent or radiopaque, i.e. at least in part the outer structures of the device can be detected by a X-ray measurement, for example by computed tomography (or CBCT), conventional CT or micro-CT.

The customizable gingiva body is mounted to the scan body in a fixed position. This means, that the customizable gingiva body is physically or chemically connected to the scan body during the overall treatment. Both bodies keep, in principle, their orientation during the treatment although the customizable gingiva body is modelled to the gingiva line. The physical or chemical fixation may for instance be achieved by cementing or gluing both part together. In addition, it is possible that the fixation is achieved by mechanical parts, allowing an unchanged position of both parts during the treatment, but being releasable e.g. by intentionally pressing a button or unscrewing both devices. This set-up ensures a defined orientation of parts and is superior to a situation, wherein one or both parts are able to be displaced. Preferably, the fixation includes that both bodies, the scan and the gingiva-body, are allowed to change their relative position at the point of connection by less than 1 mm, preferably by less than 0.5 mm, more preferred by less than 0.1 mm during the treatment.

The gingiva body comprises a thermoplastic polymer adapted to be captured by a scanning device and at least partially comprising a polymer comprising a melting point of ≥35° C. and ≤80° C. This means that besides the scan body also the customizable gingiva body is, for instance optically, distinguishable from the other tooth surrounding and the scan body. The material is scanable and additionally comprises a low to medium melting point. The latter is important in order to apply a partially molten or plasticized gingiva body in the oral cavity. Within the given temperature range for the thermoplastic polymer melting and based on the combination of the scan body and the customizable gingiva body it is possible to establish a suitable time interval to adapt the customizable gingiva body to the gingiva of the patient without harming the tissue. Higher temperatures may be disadvantageous because this might lead to a tissue damage based on the heat transfer during the adaption process. Lower temperatures may be disadvantageous, because the time frame for the adaption process may be too short. Thermoplastic polymers can for instance be selected from the group consisting of thermoplastic polyesters, polyethers, polythioethers, polyarylalkylenes, polysilanes, polyamides, polyolefins, polyurethanes or mixtures of at least two members of that list.

In a preferred embodiment of the dental device the gingiva body may comprise polycaprolactone (PCL). For an advantageous physical and chemical interaction between the scan body and the customizable gingiva body it has been found useful to use PCL material for the customizable gingiva body. The PEEK-PCL combination is mechanically stable and it is possible to generate a very solid fixture between both materials comprising only little movements between both parts during the treatment. Especially, the latter results in a very precise and stable geometric relation between both parts, which can be used to generate highly precise digital models in a scanning process. PCL is a polymer comprising the following repetition units:

Besides the PCL the customizable gingiva body may comprise further polymers or additional substances like fillers, pigments, rheology modifiers, medicaments, antibacterial substances (e.g. antibacterial ions), stabilizers, etc.

In a further preferred embodiment of the dental device the gingiva body may comprise ≥60 weight % and ≤100 weight % polycaprolactone (PCL). PCL at rather high contents has especially been found useful for the gingiva portion of the inventive dental device. PCL comprises the right heat capacity and the right mechanical properties in the non-molten state. This allows a rather long time frame for performing the adaption to the patient's gingiva line at moderate temperatures. This reduces the risk of harming the patient in the adaption routine. In addition, the viscoelastic PCL properties allow a very precise modelling of the gingiva tissue, which in turn results in a very aesthetic and natural customized gingiva model. In a preferred embodiment the customizable gingiva body may comprise ≥70 weight % and ≤100 weight %, and further preferred ≥85 weight % and ≤100 weight % PCL. Such PCL contents result in a mechanical stable device and comprise the "Tight" thermoplastic behavior for a reproducible and convenient customization routine.

In another preferred aspect of the dental device the customizable gingiva body may comprise polycaprolactone comprising a melting point of ≥40° C. and ≤65° C. and a glass transition temperature ≥−70° C. and ≤−50° C. It has been found suitable to use a PCL material comprising the above described thermal properties. Without being bound to the theory it is assumed that the melting point in combination with the glass transition temperature range allows a favorable adaption or modelling time and safety regime. The time for a proper adaption process is longer compared to other PCL materials comprising out of scope properties and the material is "fluid" enough to achieve a very precise adaption to the gingiva tissue of the patient. In addition, it was found that the material could be re-worked in-vivo, resulting in an easy to model device.

In a preferred characteristic of the dental device the customizable gingiva body comprises polycaprolactone comprising an elastic modulus according to DIN EN ISO 527-3:2018 of ≥250 MPa and ≤400 MPa. This range of polycaprolactone elastic moduli assures the "right" range to allow a detailed adaptation of the heated material to the natural gingiva line and assures a high level of details Based on the accessible detail level a very natural looking model is obtainable.

In another preferred aspect of the dental device the customizable gingiva body comprises polycaprolactone comprising a flexural strength according to DIN EN ISO 527-3:2018 of ≥35 MPa and ≤80 MPa. This flexural strength range allows a rigid fixation between the scan body and the gingiva part and results in an easy adaptation process, wherein the connection between the scan body and the gingiva part is securely maintained.

In a preferred embodiment of the dental device each of the customizable gingiva and the scan body may comprise at least one orientation marker individually adapted to be captured by a scanning device. Besides the feature that both, the scan body and the customizable gingiva body, are scanable, it has been found useful that both device parts also comprise regions in or at the device, wherein the scanable response is different compared to the rest of the body. This means that the scan body comprises one or more defined regions, wherein the scanable response is different compared to the rest of the scan body. This is achievable by integration of certain device parts comprising a different color, composition or X-ray absorption coefficient. Furthermore, it is also possible that the orientation marker is a missing or an additional part of the scan body, for instance a cavity, opening or notch or an attachment or extension. The spare or additional part is able to visualize the 3D orientation and the high of the scan body. The same orientation marker can be present at or in the customizable gingiva body, wherein both parts does not necessarily have to comprise the same type of orientation marker. The orientation marker may help to define the orientation of the overall device with respect to the oral cavity or with respect to the neighboring teeth. In addition, the marker is also helpful for defining the orientation of the customizable gingiva body with respect to the scan body (or vice versa).

In a further preferred aspect of the dental device the customizable gingiva and scan body orientation marker may be X-ray scanable. In order to also integrate the ability to obtain high resolution X-ray profiles from the dental device it has been found useful that the scan body and gingiva part comprise X-ray scanable orientation marker. This may reduce the overall amount of different scan-procedures and is able to establish the same high resolution scale for both parts using standard dentist equipment.

In another preferred aspect of the dental device the customizable gingiva body may comprise mirror symmetry and the ratio of the gingiva body front and back side dimensions to the gingiva body lateral dimensions can be ≥1.1 and ≤2.0. It has been found useful within the customization process that the customizable gingiva body is symmetrically shaped before heating and adaption to the patient's gingiva line. For instance, it is possible that the symmetry line divides the center portion of the customizable gingiva body and "separates" this portion in a front and back part. The front part may be oriented out of the oral cavity and the rear part may be heading into the oral cavity. This may ease the adaptation process. In addition, it has been found useful that the front and the back of the customizable gingiva body comprise more material compared to the right and left side of the body. This is expressed by the above given ratio, wherein back and front dimensions are larger compared to the lateral dimension. This enables a fast and easy customization process without the need to cut and waste large parts of the customizable gingiva body. In a further preferred embodiment the ratio may be ≥1.2 and ≤1.8, further preferred ≥1.3 and ≤1.7.

In another preferred embodiment of the dental device the customizable gingiva body may comprise a concave or convex symmetry. For a better handling of the heated customizable gingiva body and for a better customization process it has been found useful to employ a customizable gingiva body in the above mentioned shape. The shape ensures the presence of the right amount of heated material for a complete and easy customization process. Therefore, the amount of re-shaping is reduced, leading to a less timely adaptation process.

It is further within the scope of the invention to disclose a process for the production of a customized dental model at least comprising the steps of:
a) Providing a dental device according to the invention;
b) at least partially heating the customizable gingiva body of the dental device above the melting temperature;
c) connecting the device obtained in step b) to a dental implant fixture in the oral cavity of a patient;
d) at least partially adapting the customizable gingiva part at least partially to the gingiva line of the patient;
e) scanning the customized configuration of the dental device obtained in step d) within the oral cavity to obtain 3D scan data of the customized device;
f) building a customized digital model including a customized gingiva part based on the scan data obtained in step c).

Surprisingly, it has been found that above depicted process is able to result in a very precise and natural digital model, which mirrors the in-vivo situation in a much better way compared to standard processes, which are based on pre-fabricated parts, only. Based on the digital model further treatment options can be evaluated and further parts can be fabricated, wherein a tooth replacement can be provided comprising a higher quality compared to standard routines.

The customized dental model includes at least the scan body and the customized gingiva body and optionally parts or the complete surrounding of the tooth surrounding. Based on the data further parts like crowns, bridges, inlays, onlays, veneers or dental implant articles can be manufactured, which can be used together with the dental device. The model can be a real plaster, alginate or gypsum or a digital model. Based on the model data it is for instance possible to manufacture the further dental parts via an additive manufacturing process.

In process step a) a dental device according to the invention is provided, wherein this part at least comprises the scan body and the customizable gingiva body. This device is prepared in process step b), wherein at least the customizable gingiva body of the dental device is partially heated above the melting temperature. Within this process step the polymer of the customizable gingiva body is fluidized, i.e. transformed from a rigid to a soft and pliable structure. This process step can for instance be performed in a water bath or by air heating of the customizable gingiva body. Preferably the temperature of the customizable gingiva body is heated to a temperature of +5° C., preferably +10° C. above the melting temperature of the polymer building the customizable gingiva body.

In process step c) the device obtained in step b) is connected to a dental implant fixture in the oral cavity of a patient. The prepared and heated dental device is attached to the implant fixture. This step may be achieved by a screw inserted at the lower end of the scan body and screwing the device into the implant fixture or by screwing the scan body to a screw screwed to the implant fixture.

In process step d) the customizable gingiva part is at least partially adapted to the gingiva line of the patient. In this process step the still warmed or heated customizable gingiva body is modelled to the gingiva line of the patient in the oral cavity. This step can be performed by manual manipulation of the customizable gingiva body shape or with the help of other devices like a spoon or spatula. At the end of this process step the surface of the customizable gingiva body comprises the shape of the patient's natural gingiva line.

In process step e) the customized configuration of the dental device obtained in step d) is scanned within the oral cavity to obtain 3D scan data of the customized device. The dental device is scanned in the in-vivo surrounding by a scanner. The scanner can be an intra-oral scanner, which is capable of scanning both dental device sides, i.e. the front side directed out of and the back side directed to the oral cavity. It is possible to scan only the front side or both sides of the dental device. In order to obtain a full picture preferably both sides of the device are at least scanned once. The scan data can for instance be in the form of one or more 2D-images. The scanning method may be an optical method based on a CCD-camera or the scanning may be based on a different scan source, for instance an X-ray scan. In addition, it is also possible to use an io-scanner.

In process step f) a customized digital model including a customized gingiva part based on the scan data obtained in step e) is build. The one or more scans obtained in the previous step are transferred into a digital 3D-model at least representing the dental device or the device including the device surrounding. The 3D-scan data at least comprise information about the position and the relative distances between the scanned subjects. The appearance of the lower gingiva part can be modelled based on the volume changes of the upper customized gingiva part. The 3D-model can for instance be provided by the software of the intra-oral scanner or the model can be built on a different computer.

Within a further preferred embodiment of the process the building of the digital model is based on the data obtained in the step c) and additional scan data of the customized multi-part dental device outside the oral cavity. In order to enhance the details of the model and in order to also include the lower surface of the customized gingiva body it has been found useful to generate the model including also further scan data obtained from the part not being scanable inside of the oral cavity. These additional data may further be helpful to get the full 3D implant picture and may, in addition, help to detect improper alignments between the natural and the customized gingiva part.

In another preferred aspect of the process for obtaining the additional scan data of the dental device outside of the oral cavity the dental device can be attached to a scan-element. The detail level of the model can be increased by using more scan data, wherein the scan data are obtained in a fixed position of the dental device. The device can for instance be screwed to a scan-element comprising the same attachment means as the implant fixture. Therefore, it is possible to obtain the scan data at the same orientation and height compared to the position within the oral cavity. In addition, the scan-element can fix the dental device in a certain position and may help to obtain better scan results. Consequently, the different data can be matched in a more precise way.

Within a preferred characteristic of the process the scanning in step e) is performed by an optical intra oral scanner. Intra oral scanner (io-scanner) has been found useful for obtaining the right detail level for building a proper model including the natural gingiva line of the patient.

In addition, it is within the scope of the invention to disclose the use of the digital model obtained by the inventive process to manufacture a customized crown model comprising a customized gingiva portion. For the advantages of the inventive use it is explicitly referred to the advantages of the inventive process and the advantages of the inventive dental device.

BRIEF DESCRIPTION OF THE DRAWINGS

The present invention will be further described with reference to the following figures without wishing to be limited by them.

DETAILED DESCRIPTION

Figure 1:
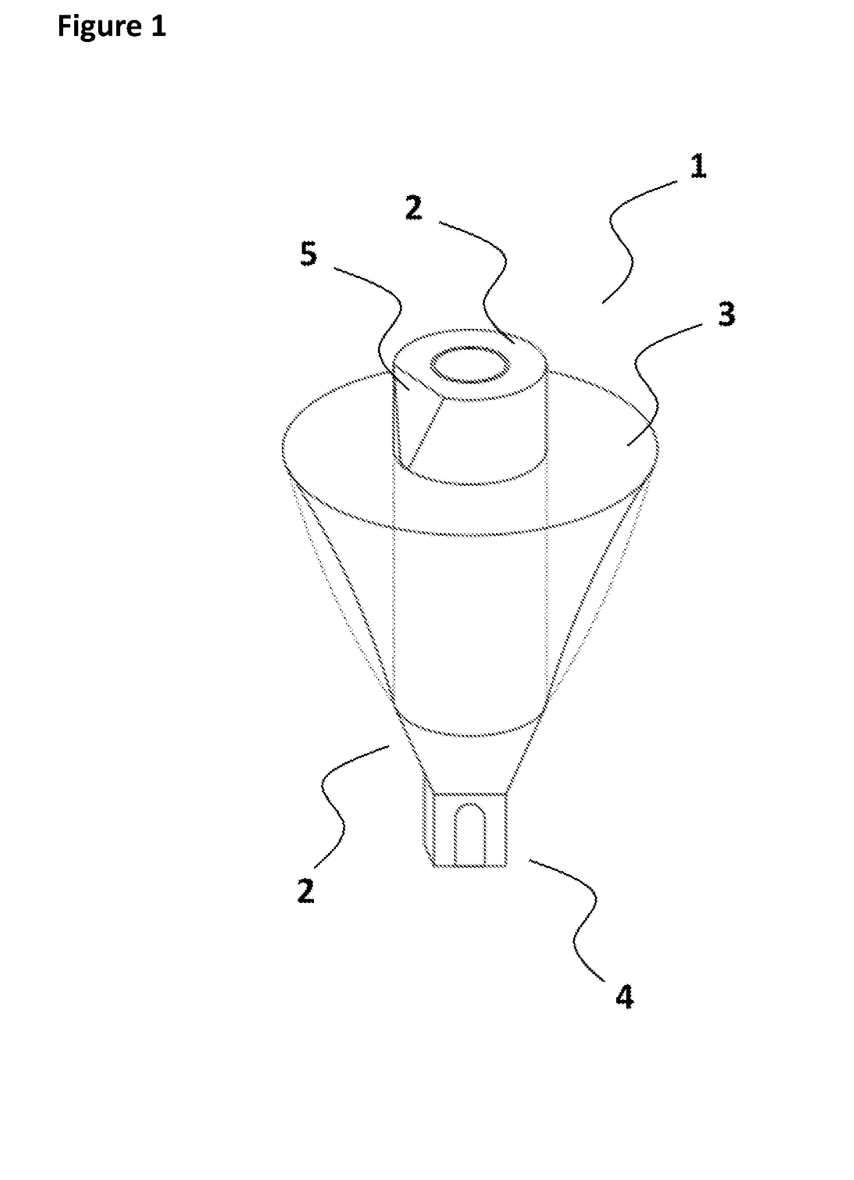
FIG. 1 shows a schematic representation of the inventive dental device prior to customization.

FIG. 1 shows the inventive dental device (1). The device (1) at least comprises two different parts, i.e. the scan body (2) and the customizable gingiva body (3). The upper part of the scan body (2) is shaped like a tube and the inner scan body (2) is void. The lower part of the scan body (4) is adapted to be connected to an implant. For instance, it is possible that in the lower part of the scan body (4) a screw is inserted, wherein the connection to the implant is achieved by screwing the dental device (1) into the implant. The customizable gingiva body (3) is shaped like a cone and this part is made from a thermoplastic polymer. This part can be heated and adapted in-vivo to the gingiva line of a patient after e.g. a tooth extraction and implant setting. The outer appearance of the customizable gingiva body (3) may be convex or concave. The scan body (2) comprises a scan body orientation marker (5). The scan body orientation marker (5) may be used to determine the position and orientation of the dental device (1) after fixation of the dental device (1) into the implant.

Figure 2:
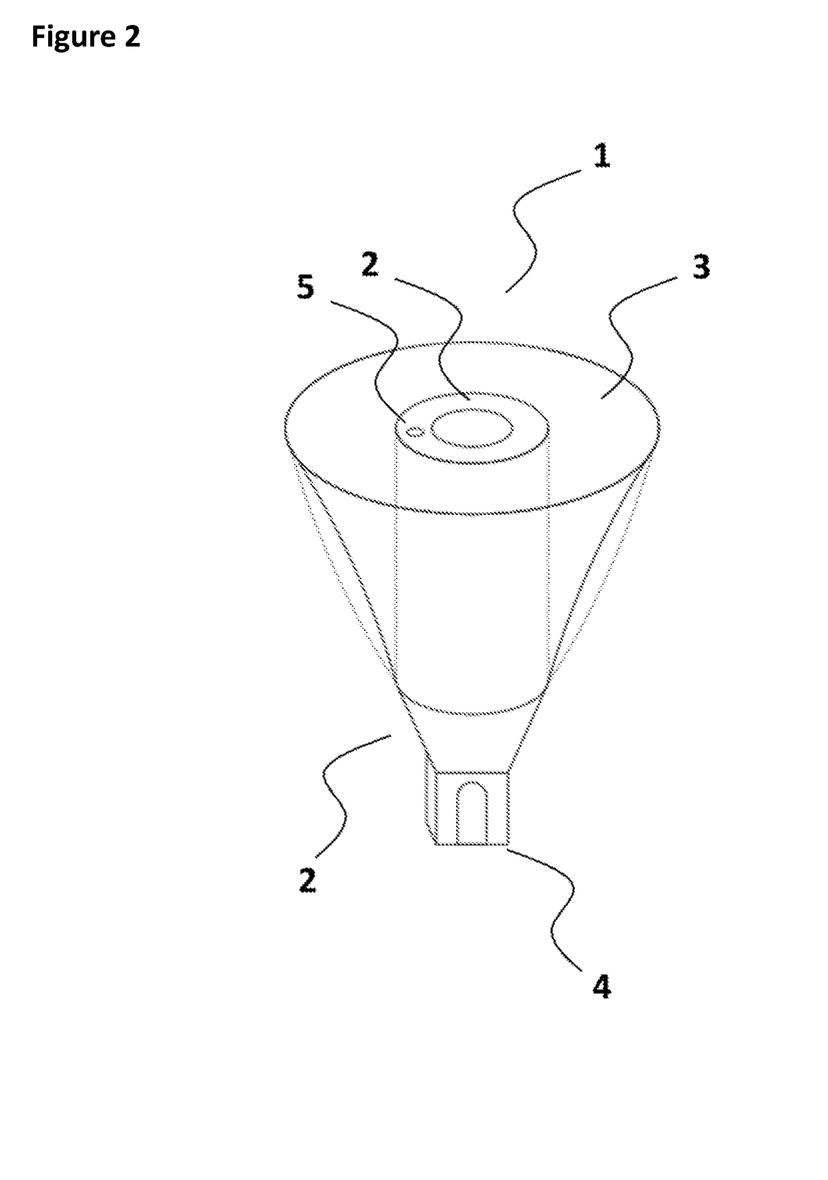
FIG. 2 shows a schematic representation of the inventive dental device prior to customization.

FIG. 2 shows the inventive dental device (1). The device (1) comprises the same features as described for FIG. 1. Contrary to FIG. 1 this figures exhibits a scan body orientation marker (5) in the form of a small hole in the scan body (2). During a scan procedure this hole can be detected and the orientation of the overall dental device (1) can be determined even under in-vivo conditions.

Figure 3:
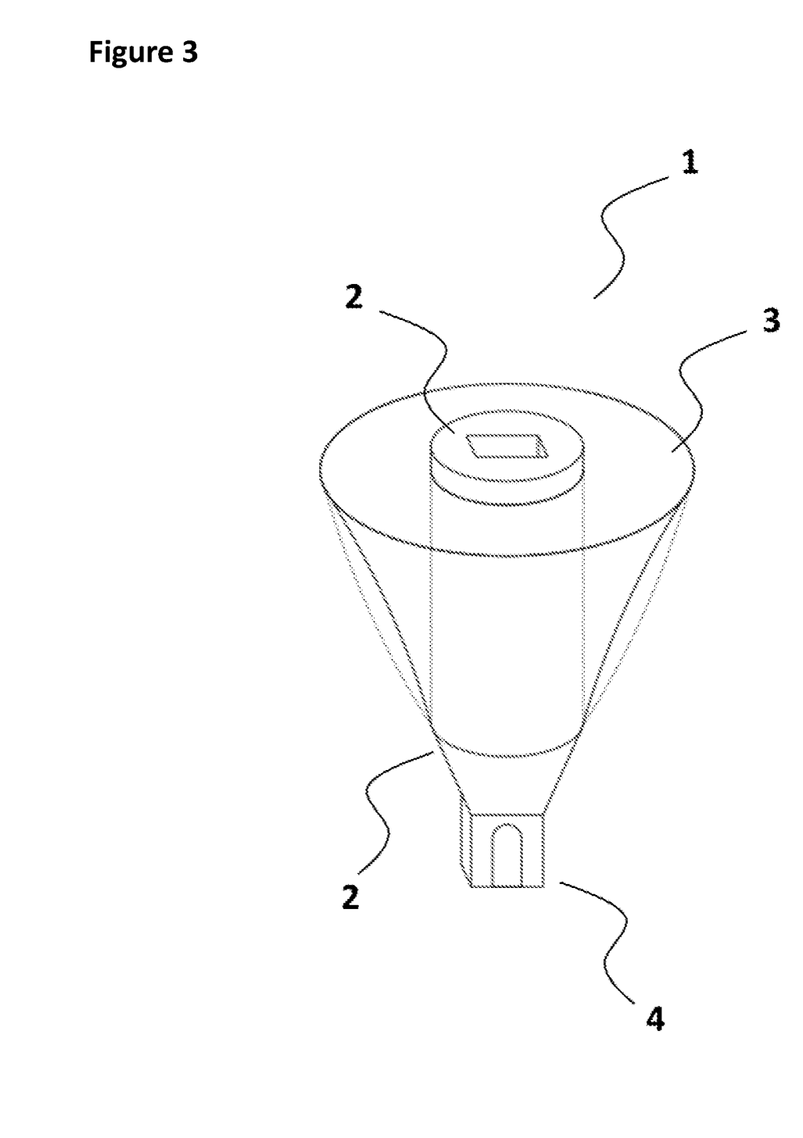
FIG. 3 shows a schematic representation of the inventive dental device prior to customization.

FIG. 3 shows the inventive dental device (1). The device (1) comprises the same features as described for FIG. 1. Contrary to FIG. 1 this figures exhibits no scan body orientation marker (6) and the scan body (2) comprises a rectangular hole in the middle of the scan body (2).

Figure 4:
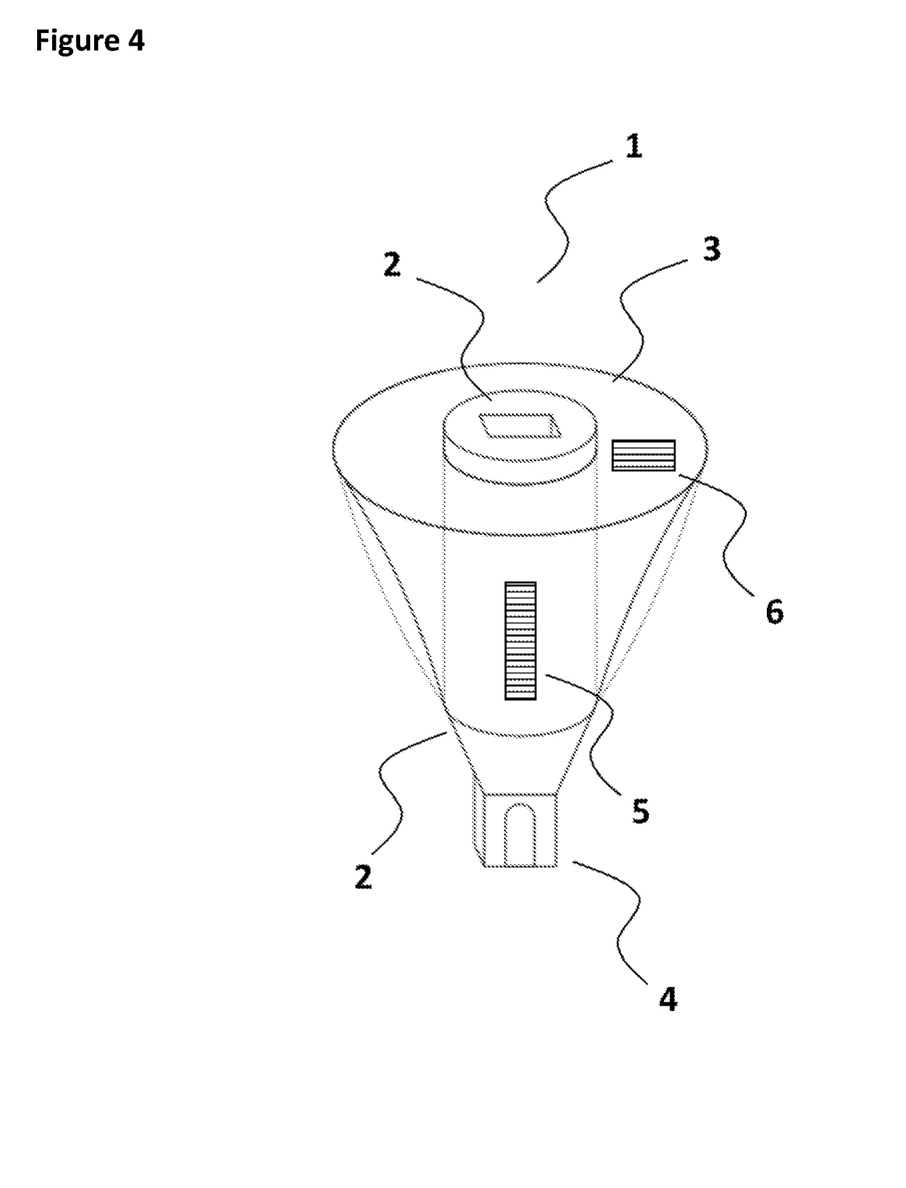
FIG. 4 shows a schematic representation of the inventive dental device prior to customization.

FIG. 4 shows the inventive dental device (1). The device (1) comprises the same features as described for FIGS. 1 and 3. Contrary to FIG. 3 this figures exhibits two different orientation maker. A rectangular scan body orientation marker (5) and a rectangular customizable gingiva body (3) orientation marker (6). The orientation marker may be formed by a material comprising different optical or X-ray absorption properties compared to the other parts of the scan body (2) and the customizable gingiva body (3). Based on the two different marker (5) the overall orientation of the dental device (1) and the scan body (2) and the customizable gingiva body (3) can be traced.

Figure 5:
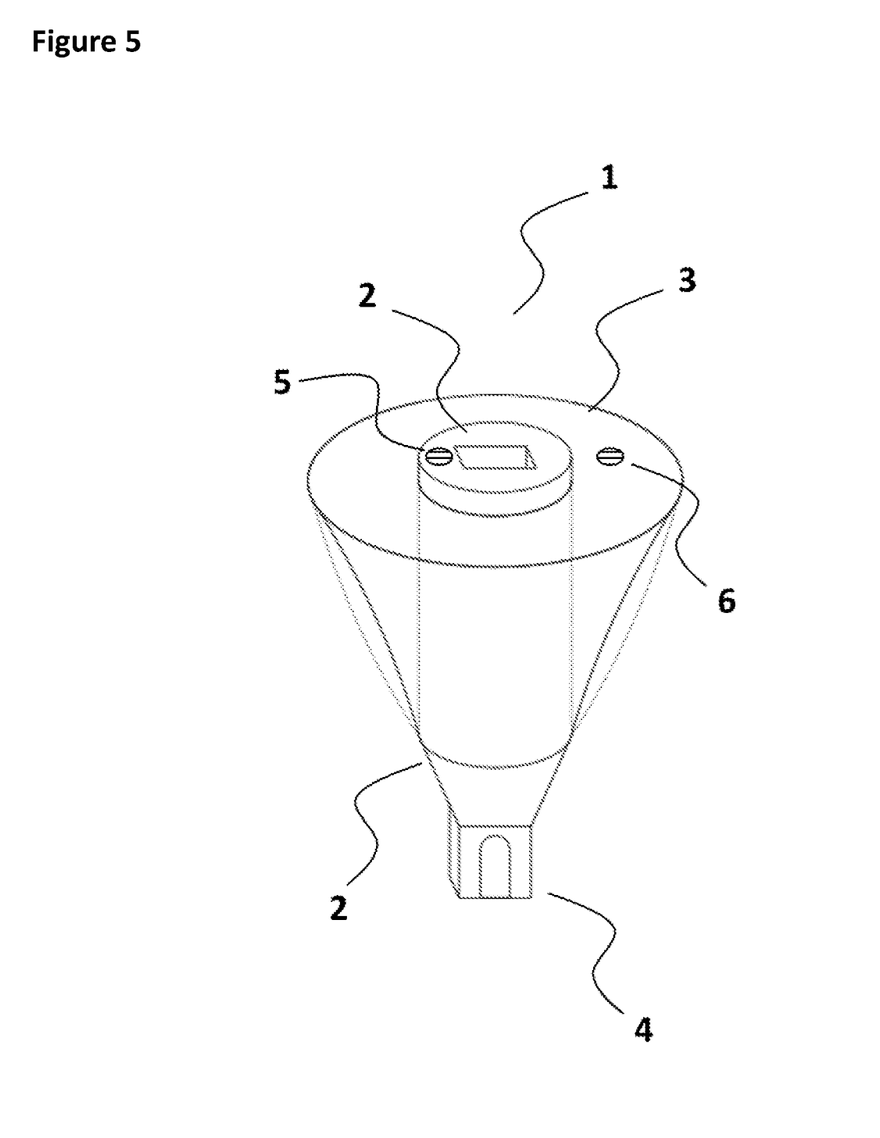
FIG. 5 shows a schematic representation of the inventive dental device prior to customization.

FIG. 5 shows the inventive dental device (1). The device (1) comprises the same features as described for FIG. 1. Contrary to FIG. 4 this figures exhibits two different orientation maker (5), one marker for (5) the scan body (2) and one marker (6) for the customizable gingiva body (3). Both marker comprise a rounded shape and are located on the surface of the scan body (2) and the customizable gingiva body (3).

Figure 6:
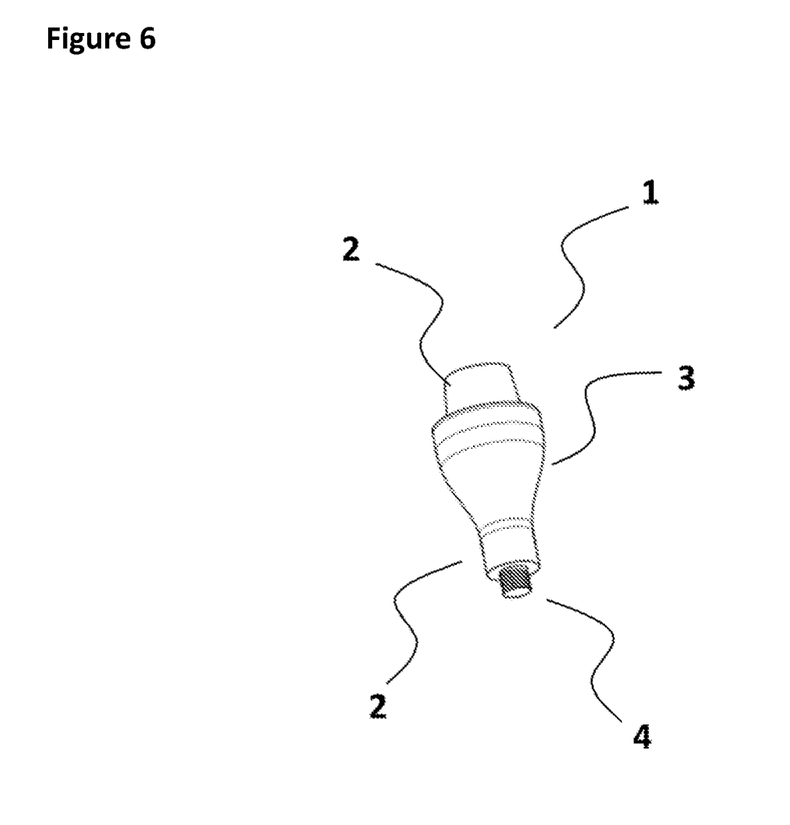
FIG. 6 shows a schematic representation of the inventive dental device prior to customization.

FIG. 6 shows the inventive dental device (1) in another representation. The device (1) comprises the same features as described for FIG. 1. Here explicitly a screw (4) is depicted for the connection of the dental device (1) to the implant (not shown). The customizable gingiva body (3) nearly extends to the lowest part of the scan body (2). The cross-over between the scan body (2) and the customizable gingiva body (3) is depicted by the two horizontal lines in the lower part of the scan body (2).

Figure 7:
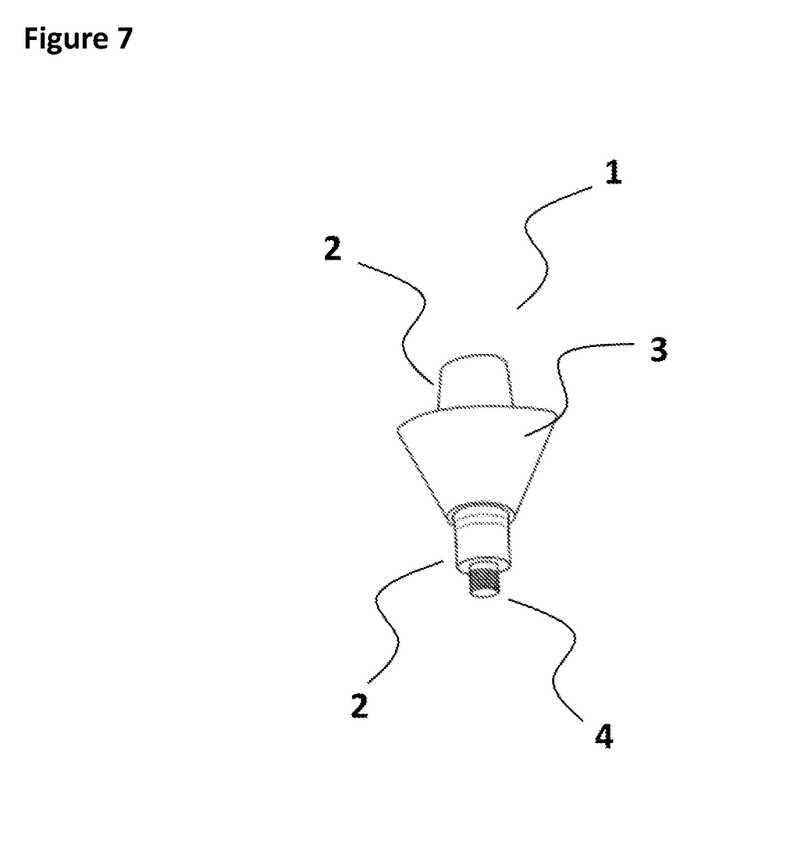
FIG. 7 shows a schematic representation of the inventive dental device prior to customization.

FIG. 7 shows the inventive dental device (1) in another representation. The device (1) comprises the same features as described for FIG. 1. In this figure explicitly a screw (4) is depicted for the connection of the dental device (1) to the implant.

Figure 8:
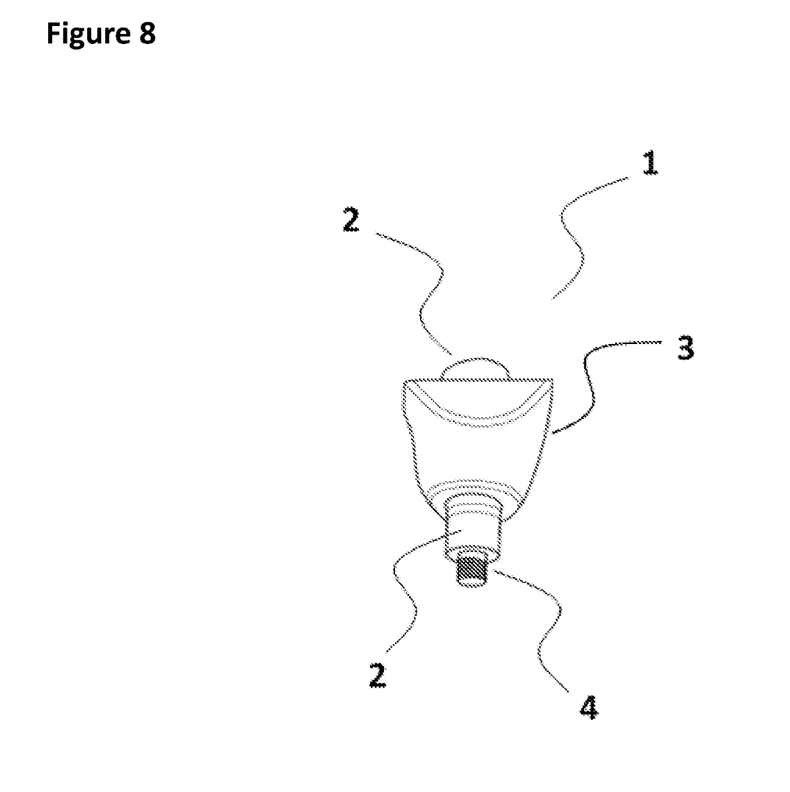
FIG. 8 shows a schematic representation of the inventive dental device after customization.

FIG. 8 shows the inventive dental device (1) in another representation. The device (1) comprises the same features as described for FIG. 1. In this figure explicitly a screw (4) is depicted for the connection of the dental device (1) to the implant. Contrary to the other representations it is also displayed that the customizable gingiva body (3) is customized to a gingiva line. The latter can be seen because the upper edged of the customizable gingiva body (3) now extends downwards.

Figure 9:
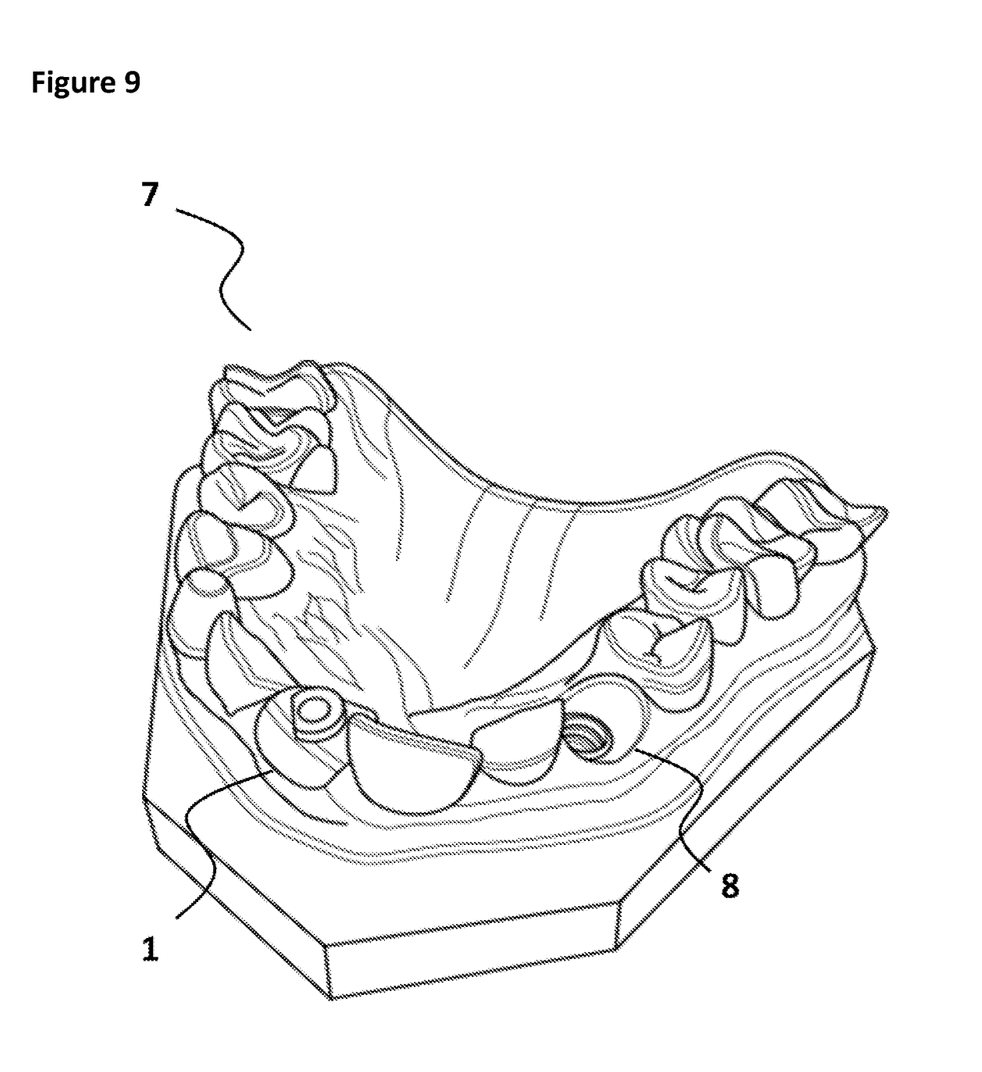
FIG. 9 shows a plaster model of a lower jaw including the inventive dental device after customization.

FIG. 9 shows the inventive dental device (1) in a dental plaster model (7). The model comprises a dental arch, wherein two teeth were extracted and implants inserted (8). In one of the implant the dental device (1) is inserted and the customizable gingiva body (3) is adapted to the gingiva line of the patient.

Figure 10:
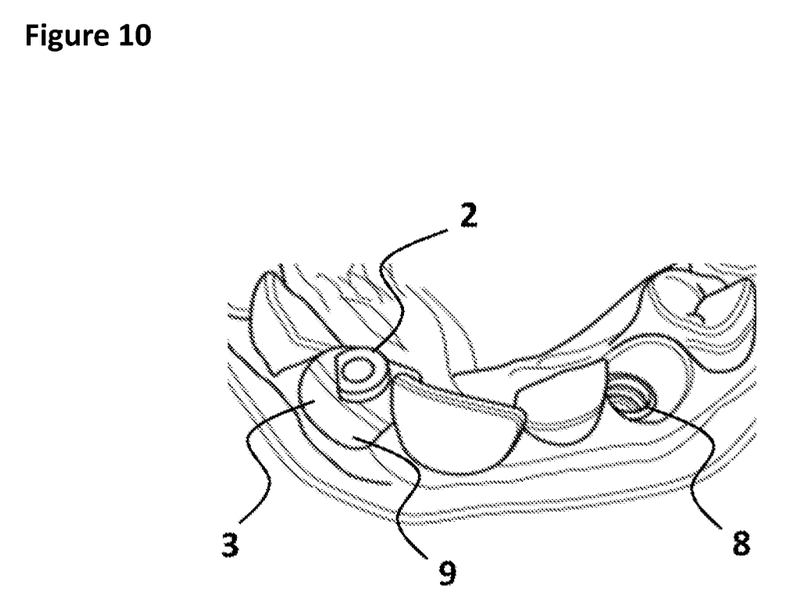
FIG. 10 shows a magnification of a plaster model of a lower jaw including the inventive dental device after customization.

FIG. 10 shows the inventive dental device (1) in a dental plaster model (7). This representation is a magnification of a section of FIG. 9. The scan body (2) and the customizable gingiva body (3) part are depicted in this magnification. The lower part of the scan body (2) is not visible and connected to the implant. In addition, the front side of the gingiva body (9) is marked. The front side is directed to the outside, wherein the back side of the customizable gingiva body (3) is directed to the inside of the oral cavity.

LIST OF REFERENCE NUMERALS AND SIGNS 1 dental device
2 scan body
3 customizable gingiva body
4 connector side to dental implant fixture
5 scan body orientation marker
6 gingiva body orientation marker
7 dental model
8 dental implant fixture
9 gingiva body front side

The invention claimed is:

1. A dental device adapted to be connected to a dental implant fixture, the device comprising:
  a scan body comprising polyether ether ketone (PEEK) adapted to be connected to the dental implant fixture and adapted to be captured by a scanning device, and
  a customizable gingiva body mounted to the scan body in a fixed position to keep the customizable gingiva body and the scan body held together in a defined orientation before and during connection to the dental implant, and adapted to be captured by a scanning device, wherein:

the gingiva body comprises polycaprolactone (PCL) in an amount of 100 weight %, the PCL includes a melting point that is ≥40° C. and ≤65° C., and a glass transition temperature that is ≥−70° C. and is ≤−50° C., the PCL includes an elastic modulus according to DIN EN ISO 527-3:2018 of ≥250 MPa and ≤400 MPa, and each of the customizable gingiva body and the scan body comprise at least one orientation marker individually adapted to be captured by a scanning device.

2. The dental device according to claim 1, wherein the PCL includes a flexural strength according to DIN EN ISO 527-3:2018 of ≥35 MPa and ≤80 MPa.

3. The dental device according to claim 1, wherein the customizable gingiva and scan body orientation markers are X-ray scanable.

4. The dental device according to claim 1, wherein the customizable gingiva body comprises mirror symmetry and the ratio of the gingiva body front and back side dimensions to the gingiva body lateral dimensions is ≥1.1 and ≤2.0.

5. The dental device according to claim 1, wherein the customizable gingiva body comprises a concave or convex symmetry.

6. A process for the production of a customized dental model comprising:

a) providing the dental device according to claim 1;

b) at least partially heating the customizable gingiva body of the dental device above the melting temperature;

c) connecting the device obtained in step b) to a dental implant fixture in the oral cavity of a patient;

d) at least partially adapting the customizable gingiva body at least partially to the gingiva line of the patient;

e) scanning the customized configuration of the dental device obtained in step d) within the oral cavity to obtain 3D scan data of the customized device;

f) building a customized digital model including a customized gingiva part based on the scan data obtained in step e).

7. The process according to claim 6, wherein the building of the digital model is based on the data obtained in the step e) and additional scan data of the customized dental device outside the oral cavity.

8. The process according to claim 6, wherein for obtaining the additional scan data of the dental device outside of the oral cavity the dental device is attached to a scan-element.

9. The process according to claim 6, wherein the scanning in step e) is performed by an optical intra oral scanner.

10. The process according to claim 6, further comprising manufacturing a customized crown model comprising a customized gingiva portion based on the digital model.

* * * * *